US005256875A

United States Patent [19]

Hoekman et al.

[11] Patent Number: 5,256,875

[45] Date of Patent: Oct. 26, 1993

[54] METHOD FOR GENERATING FILTERED NOISE SIGNAL AND BROADBAND SIGNAL HAVING REDUCED DYNAMIC RANGE FOR USE IN MASS SPECTROMETRY

[75] Inventors: Doneil J. Hoekman, Gilray; Paul E. Kelley, San Jose, both of Calif.

[73] Assignee: Teledyne MEC, Mountain View, Calif.

[21] Appl. No.: 928,262

[22] Filed: Aug. 11, 1992

Related U.S. Application Data

[63] Continuation-in-part of Ser. No. 884,455, May 14, 1992.

[51] Int. Cl.[5] .................... B01D 59/44; H01J 49/40

[52] U.S. Cl. .................... 250/282; 250/292

[58] Field of Search .................... 250/282, 290, 292

[56] References Cited

U.S. PATENT DOCUMENTS

| | | | |
|---|---|---|---|
| 4,540,884 | 9/1985 | Stafford et al. | 250/282 |
| 4,736,101 | 4/1988 | Syka et al. | 250/292 |
| 4,749,860 | 6/1988 | Kelley et al. | 250/282 |
| 4,761,545 | 8/1988 | Marshall et al. | 250/291 |
| 4,771,172 | 9/1988 | Weber-Grabau et al. | 250/282 |
| 4,818,869 | 4/1989 | Weber-Grabau et al. | 250/282 |
| 4,882,484 | 11/1989 | Franzen et al. | 250/282 |
| 4,959,543 | 9/1990 | McIver et al. | 250/291 |
| 4,975,577 | 12/1990 | Franzen et al. | 250/291 |
| 5,075,547 | 12/1991 | Johnson et al. | 250/292 |
| 5,105,081 | 4/1992 | Kelley | 250/282 |
| 5,134,286 | 7/1992 | Kelley | 250/282 |
| 5,187,365 | 2/1993 | Kelley | 250/290 |

FOREIGN PATENT DOCUMENTS

| | | |
|---|---|---|
| 180328 | 5/1986 | European Pat. Off. . |
| 383961 | 2/1988 | European Pat. Off. . |
| 336990 | 4/1988 | European Pat. Off. . |

OTHER PUBLICATIONS

Wang, et al., "Extension of Dynamic Range in Fourier Transform Ion Cyclotron Resonance Mass Spectrometry Via Stored Memory Inverse Fourier Transform Excitation," *Anal. Chem.*, 1986, 5B, 2935–2938.

Dawson, et al., "Non-Linear Resonance in Quadrupole Mass Spectrometers Due To Imperfect Fields, I. The Quadrupole Ion Trap", *International Journal of Mass Spectrometry and Ion Physics*, 2, (1969) 45–59, pp. 45–59.

*Primary Examiner*—Bruce C. Anderson
*Attorney, Agent, or Firm*—Limbach & Limbach

[57] ABSTRACT

A method for generating a filtered noise signal, which includes the steps of generating a broadband signal having optimized (reduced or minimized) dynamic range, and filtering the broadband signal in a notch filter to generate a broadband signal whose frequency-amplitude spectrum has one or more notches (the "filtered noise" signal). In preferred embodiments, the filtered noise signal is a voltage signal suitable for application to an ion trap during a mass spectrometry operation. The invention enables rapid generation of different filtered noise signals (for use in different mass spectrometry experiments) by filtering a single, optimized broadband signal using a set of different notch filters, each having a simple, easily implementable design. The invention enables rapid generation of filtered noise signals (for example, in real time during mass spectrometry experiments) without prior knowledge of the mass spectrum of unwanted ions to be ejected from a trap during application of the filtered noise signal to the trap. The invention also enables rapid generation of a filtered noise signal having no missing frequency components outside the notches of the notch filter employed to generate the filtered noise signal. Digital values indicative of the amplitude, frequency, and phase of each sinusoidal (or other periodic) component of an optimized broadband signal can be iteratively generated by a digital computer in accordance with the invention, and the digital values can then be processed to generate an analog version of the optimized broadband signal.

28 Claims, 5 Drawing Sheets

METHOD FOR GENERATING FILTERED NOISE SIGNAL AND BROADBAND SIGNAL HAVING REDUCED DYNAMIC RANGE FOR USE IN MASS SPECTROMETRY

CROSS-REFERENCE TO RELATED APPLICATION

The present application is a continuation-in-part of U.S. patent application Ser. No. 07/884,455, filed May 14, 1992.

FIELD OF THE INVENTION

The invention relates to a method for generating a filtered noise signal by generating a broadband signal having reduced dynamic range, and filtering the broadband signal in a selected notch filter. In preferred embodiments, the invention is a method for generating a filtered noise signal of a type suitable for application in mass spectrometry, by generating a broadband signal having reduced dynamic range and filtering the broadband signal in a selected notch filter.

BACKGROUND OF THE INVENTION

In a class of conventional mass spectrometry techniques, ions having mass-to-charge ratios within a selected range (or set of ranges) are isolated in an ion trap, and the trapped ions are then excited for detection. In conventional variations on such techniques, ions trapped during a first (mass storage) step are allowed or induced to react (or dissociate) to produce other ions, and the other ions are excited for detection during a second (mass analysis) step.

For example, U.S. Pat. No. 4,736,101, issued Apr. 5, 1988, to Syka, et al., discloses a mass spectrometry method in which ions (having a mass-to-charge ratio within a predetermined range) are trapped within a three-dimensional quadrupole trapping field. The trapping field is then scanned to eject unwanted parent ions (ions other than parent ions having a desired mass-to-charge ratio) consecutively from the trap. The trapping field is then changed again to become capable of storing daughter ions of interest. The trapped parent ions are then induced to dissociate to produce daughter ions, and the daughter ions are ejected consecutively (sequentially by m/z) from the trap for detection.

It is often useful to apply broadband voltage signals to an ion trap to eject unwanted ions from the trap during performance of any (or all) of the ion storage, ion reaction or dissociation, and ion analysis steps of a mass spectrometry operation.

For example, U.S. Pat. No. 5,134,826, issued on Jul. 28, 1992 (based on U.S. Ser. No. 662,217, filed Feb. 28, 1991), describes a mass spectrometry method in which a filtered noise signal (a broadband voltage signal which has been filtered in a notch-filter) is applied to electrodes of an ion trap. The filtered noise signal can be applied during the mass storage step to resonantly eject all ions except selected parent ions out of the region of the trapping field. After application of the filtered noise signal, the only ions remaining (in significant concentrations) in the trap are parent ions having mass-to-charge ratios whose corresponding resonant frequencies fall within a notch region of the frequency-amplitude spectrum of the filtered noise signal.

U.S. Pat. No. 4,761,545, issued Aug. 2, 1988, to Marshall, et al., also discloses application of a broadband signal to an ion trap during performance of a mass spectrometry operation. Marshall et al. teach (at, for example, column 14, lines 12–14) application of a broadband signal having a notched excitation profile to an ion trap during a mass storage step (preliminary to excitation of ions of interest for detection). Marshall et al. teach the following multi-step process for generating the notched broadband signals disclosed therein:

1. selection of a mass domain excitation profile (which requires prior knowledge of the masses of both "desired" ions to be retained in a trap during application of each notched broadband excitation signal, and "undesired" ions to be ejected from the trap during application of each notched broadband excitation signal);
2. conversion of the mass domain excitation profile into a frequency domain excitation spectrum;
3. optional "phase encoding" of the components of the frequency domain excitation spectrum to reduce the dynamic range of the notched broadband excitation signal produced during the fourth step);
4. application of an inverse-Fourier transform to convert the frequency domain excitation spectrum to a notched broadband time domain excitation signal; and
5. optional weighting or shifting of the time domain excitation signal (as described in Marshall's column 3, lines 50–53).

Use and generation of time domain excitation signals as taught by Marshall is subject to several serious disadvantages, including the following. First, Marshall's technique for generating a notched broadband signal requires prior knowledge of the masses of both desired ions to be retained in the trap during application of the signal and undesired ions to be ejected from the trap during application of the signal. Marshall's technique for generating a notched broadband signal also requires construction of a complete mass domain excitation profile waveform in order to generate a time domain excitation signal for each mass spectrometry experiment.

Also, undesired missing frequency components ("holes") can result during conversion of Marshall's mass domain excitation profile into a frequency domain excitation spectrum. The risk of such undesired holes is enhanced due to the inverse relationship between mass and frequency (so that if Marshall's mass domain excitation profile has closely spaced undesired mass components corresponding to undesired ions having high "q" values, the corresponding frequency components of the frequency domain excitation spectrum generated from the mass domain excitation profile will be widely separated). Undesired holes in a notched broadband excitation signal resulting from Marshall's technique can leave unwanted ions in the trap following application of Marshall's notched broadband excitation signal to the trap.

Conventional techniques for reducing dynamic range of a broadband signal have selected a functional relationship between phase and frequency, and assigned the phase of each frequency component of the broadband signal in accordance with the selected functional relationship. For example, the phase encoding technique disclosed in Marshall (at column 9) requires selection of a nonlinear functional relation between phase and frequency, and assignment of phases of the frequency components in accordance with this functional relation. Other conventional techniques for reducing a broadband signal's dynamic range have randomly selected the phases of the frequency components of the broadband signal in an effort to randomly select a set of phases which results in reduced dynamic range. Neither of these conventional methods for generating a broadband signal with reduced dynamic range is mathematically precise, and neither allows for true optimization (i.e., dynamic range minimization) of the resulting broadband signal.

It would be desirable to generate notched broadband signals, each having low (and preferably minimized) dynamic range and frequency-amplitude spectrum specifically designed for a particular mass spectrometry operation, in a manner enabling rapid generation (for example, real time) of a sequence of such signals (for use in a sequence of different mass spectrometry operations) without significantly impeding the performance of such sequence of mass spectrometry operations. It would also be desirable to generate such notched broadband signals without a need for prior knowledge of undesired ions to be ejected during application of the notched broadband signals. It would also be desirable to generate many different notched broadband signals for many different mass spectrometry experiments, by performing rapid processing operations (for example, in real time) on a single broadband signal (having optimized dynamic range).

SUMMARY OF THE INVENTION

The invention is a method for generating a filtered noise signal, which includes the steps of generating a broadband signal having optimized (reduced or minimized) dynamic range, and filtering the broadband signal in a notch filter to generate a broadband signal whose frequency-amplitude spectrum has one or more notches (the "filtered noise" signal). In preferred embodiments, the filtered noise signal is a voltage signal suitable for application to an ion trap (or other applicable mass spectrometer) during a mass spectrometry operation. If applied to, for example, a quadrupole ion trap, the filtered noise signal creates a field which combines with the quadrupole field (having parameters U, V, and Ω), to create a new field called a filtered noise field.

The invention enables rapid generation of different filtered noise signals (for use in different mass spectrometry experiments) by filtering a single common broadband signal (having optimized dynamic range) using a set of different notch filters, each having a simple, easily implementable design.

The invention enables rapid generation of filtered noise signals (for example, in real time during mass spectrometry experiments) without prior knowledge of the mass spectrum of unwanted ions to be ejected from a trap during application of the filtered noise signal to the trap. The invention also enables rapid generation of a filtered noise signal having no missing frequency components outside the notches of the notch filter employed to generate such filtered noise signal.

In a class of preferred embodiments, two steps are performed to generate the inventive broadband signal (which is to be subsequently notch-filtered). The first step is to iteratively generate digital values indicative of the amplitude (typically voltage), frequency, and phase of each frequency component of a broadband signal having optimized dynamic range. The second step is to process these digital values to generate an analog, optimized broadband signal.

In a preferred embodiment, the iterative digital value generation is performed in a digital processor, and includes the following steps:

(a) generating a first sinusoidal (or other periodic) frequency component signal having a first frequency, a first amplitude, and a known phase angle relative to the start of the broadband waveform segment being constructed;

(b) generating a trial signal by adding the first frequency component signal to a previously determined optimal frequency component set, and generating a dynamic range signal indicative of the trial signal's dynamic range;

(c) incrementally changing the phase angle (not the frequency) of the frequency component added to the optimal frequency component set during step (b) (the "trial" frequency component) to generate a new trial frequency component;

(d) subtracting the trial frequency component from the trial signal generated in step (b), and replacing said trial frequency component by the new trial frequency component to generate a new trial signal, and generating a new dynamic range signal indicative of the new trial signal's dynamic range (in preferred embodiments of the invention, the value of the new trial signal's dynamic range is recorded);

(e) repeating steps (c) and (d) for each of M different phase angles which span a desired range, to identify one of the trial signal and the new trial signals which has minimum dynamic range as an optimal trial signal, and identifying the frequency components of the optimal trial signal as an expanded optimal frequency component set (in preferred embodiments of the invention, the frequency, amplitude, and phase of the frequency components of the optimal trial signal are recorded); and (f) repeating steps (a)–(e) for an additional sinusoidal (or other periodic) frequency component having a frequency different than that of any frequency component generated during a previous repetition of step (a).

Step (f) can be repeated for each sinusoidal (or other periodic) frequency component to be included in the optimized broadband signal (i.e., for all frequencies necessary to excite, in desired fashion, the physical system to which the optimized broadband signal will be applied), or for only a subset of such frequency components. The latter embodiments of the invention generate a partially optimized broadband signal, including one or more frequency components on which steps (a)–(e) have been performed, as well as other frequency components on which steps (a)–(e) have not been performed. In one embodiment, an analog version of the partially optimized broadband signal is generated, and the time-averaged energy of this analog signal is determined over intervals of the analog signal's total duration, T, in order to identify one or more "flat" intervals over which the time-averaged energy is substantially constant (either throughout the interval or at least over beginning and ending portions of the interval). By storing a portion of the partially optimized broadband signal having duration U (where $U<T$) and corresponding to at least one of the flat intervals, a better optimized broadband signal (having lower dynamic range than the above-mentioned partially optimized signal) can be generated from the stored flat interval signal by repeatedly clocking the flat interval signal out from storage or otherwise concatenating several identical copies of the flat interval signal.

Throughout the specification, the expression "optimized broadband signal" will be employed to denote not only fully optimized broadband signals (having minimized dynamic range), but also "partially optimized" and "better optimized" broadband signals of the types mentioned above.

Each optimized broadband signal should contain all frequencies necessary to excite the physical system to which it will be applied (for example, all undesired trapped ions to which a notch-filtered version of the optimized broadband signal will be applied), and the frequencies of its frequency components should be sufficiently close so as to present a continuous band of frequencies to the physical system with appropriate amplitude spanning the frequency range or ranges to perform the desired mass spectrometry experiment. It is desirable that the frequencies of the optimized broadband signal's frequency components should not undergo significant or any phase shifts while the optimized broadband signal is applied to the physical system.

The difference in frequency between adjacent frequency components of the optimized broadband signal, and the phase and amplitude of each of the frequency components, are preferably chosen so that each segment (having time duration longer than the period of the highest frequency component thereof) of the optimized broadband signal contributes substantially the same amount of time-averaged energy (to the system to which the signal is applied) as does every other segment of the signal having similar duration.

DETAILED DESCRIPTION OF THE PREFERRED EMBODIMENTS

Figure 1:
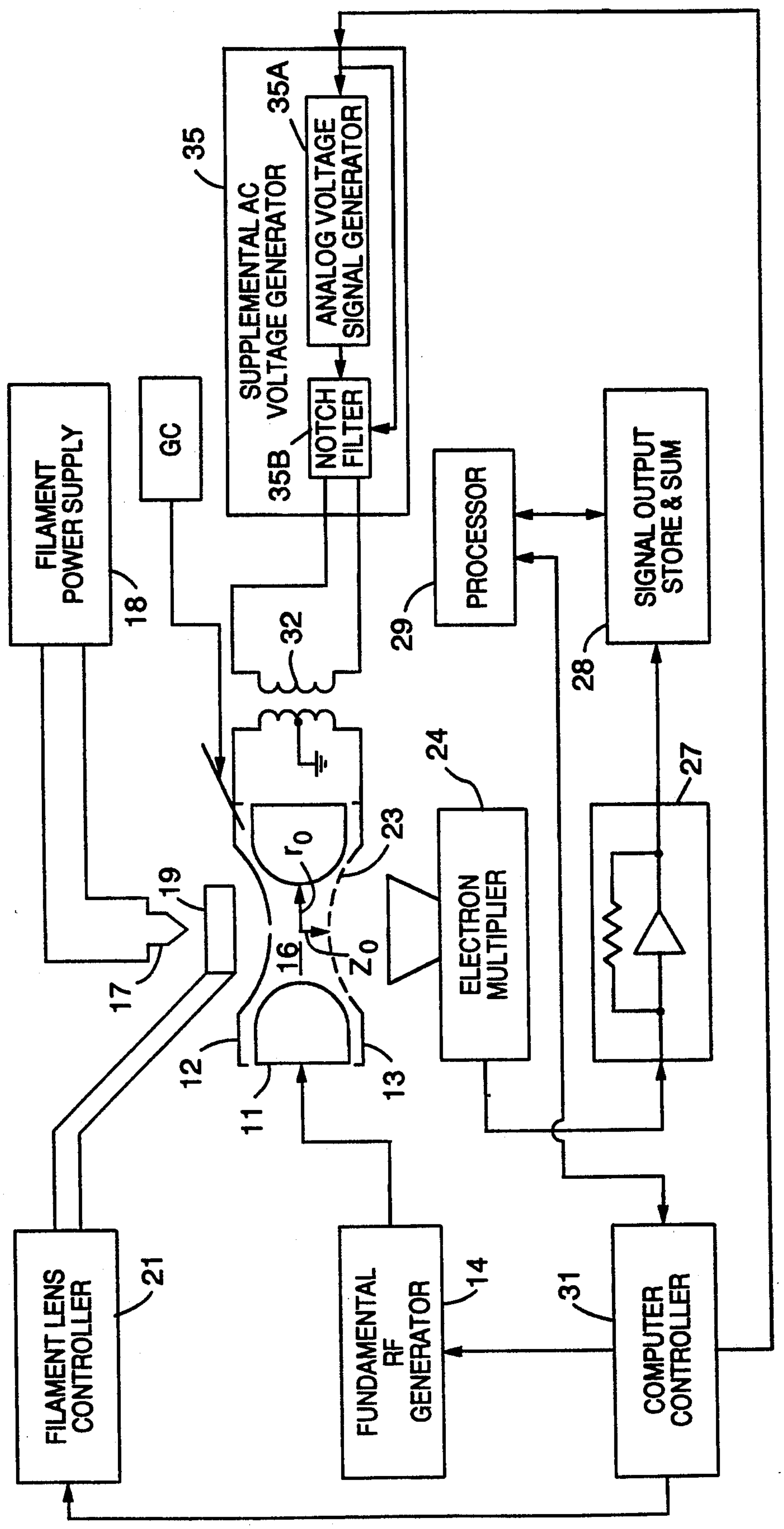
FIG. 1 is a simplified schematic diagram of an example of an apparatus for generating a class of filtered noise signals in accordance with the invention, and applying the filtered noise signals to the electrodes of an ion trap.

The apparatus shown in FIG. 1 is useful for generating filtered noise signals in accordance with the invention, and for applying the filtered noise signals to the electrodes of a quadrupole ion trap. The FIG. 1 apparatus includes ring electrode 11 and end electrodes 12 and 13. A three-dimensional quadrupole trapping field is produced in region 16 enclosed by electrodes 11-13, when fundamental voltage generator 14 is switched on to apply a fundamental RF voltage (having a radio frequency component and optionally also a DC component) between electrode 11 and electrodes 12 and 13. Ion storage region 16 has radius $r_o$ and vertical dimension $z_o$. Electrodes 11, 12, and 13 are common mode grounded through coupling transformer 32.

Supplemental AC voltage generator 35 can be switched on to apply a desired supplemental AC voltage signal to electrode 11 or to one or both of end electrodes 12 and 13 (or electrode 11 and one or both of electrodes 12 and 13). The supplemental AC voltage signal can be a filtered noise signal generated in accordance with the invention, for resonating undesired trapped ions at their axial (or radial) resonance frequencies to resonantly eject such undesired ions from region 16. It could also be used to generate a single frequency for use in any portion of a mass spectrometry experiment. If the inventive filtered noise signal is applied to one or more of electrodes 11, 12, and 13, it creates a field which combines with the quadrupole field (having parameters U, V, and Ω) resulting from application of fundamental RF voltage from generator 14, to create a new field, called a filtered noise field, in region 16.

Filament 17, when powered by filament power supply 18, directs an ionizing electron beam into region 16 through an aperture in end electrode 12. The electron beam ionizes sample molecules within region 16, so that the resulting ions can be trapped within region 16 by the quadrupole trapping field. Cylindrical gate electrode and lens 19 is controlled by filament lens control circuit 21 to gate the electron beam off and on as desired.

In one embodiment, end electrode 13 has perforations 23 through which ions can be ejected from region 16 for detection by an externally positioned electron multiplier detector 24. Electrometer 27 receives the current signal asserted at the output of detector 24, and converts it to a voltage signal, which is summed and stored within circuit 28, for processing within processor 29. In a variation on the FIG. 1 apparatus, perforations 23 are omitted, and an in-trap detector is substituted for external detector 24 or, for example, an in-situ detector could be used to measure ion image currents, such as in an ion cyclotron resonance mass spectrometer.

A supplemental AC signal of sufficient power can be applied to the ring electrode (rather than to the end electrodes) to resonate unwanted ions in radial directions (i.e., radially toward ring electrode 11) rather than in the z-direction. Application of a high power supplemental signal to the trap in this manner to resonate unwanted ions out of the trap in radial directions before detecting ions using a detector mounted along the z-axis can significantly increase the operating lifetime of the ion detector, by avoiding saturation of the detector during application of the supplemental signal.

Also, the trapping field may have a DC component selected so that the trapping field has both a high frequency and low frequency cutoff, and is incapable of trapping ions with resonant frequency below the low frequency cutoff or above the high frequency cutoff. Application of a filtered noise signal generated in accordance with the invention to such a trapping field is functionally equivalent to filtration of the trapped ions through a notched bandpass filter having such high and low frequency cutoffs.

Controller 31 generates control signals for controlling fundamental voltage generator 14, filament control circuit 21, and supplemental AC voltage generator 35. Controller 31 sends control signals to circuits 14, 21, and 35 in response to commands it receives from processor 29, and sends data to processor 29 in response to requests from processor 29.

Controller 31 preferably includes a digital processor for generating digital signals which define an optimized broadband signal in accordance with the invention, and digital signals which define a notch filter for filtering such optimized broadband signal. A digital processor suitable for this purpose can be selected from commercially available models. The digital signals asserted by controller 31 are received by supplemental AC voltage generator 35, which preferably includes analog voltage signal generation circuitry 35A for generating the analog optimized broadband signal of the invention (in response to digital values received from controller 31). In this embodiment, supplemental AC voltage generator 35 also includes a notch filter circuit 35B which implements a notch filter having parameters determined by digital values received from controller 31, and applies the notch filter to the analog optimized broadband signal from circuitry 35A to generate the filtered noise signal of the invention.

Alternatively, notch filter circuit 35B can be omitted from generator 35, the voltage signal output from generator 35A applied directly to transformer 32, and the notch filtering function accomplished by computer software within computer controller 31 (rather than by a separate filter 35B). In this case, the digital values received by analog voltage signal generation circuitry 35A define a notch filtered broadband signal.

Figure 1A:
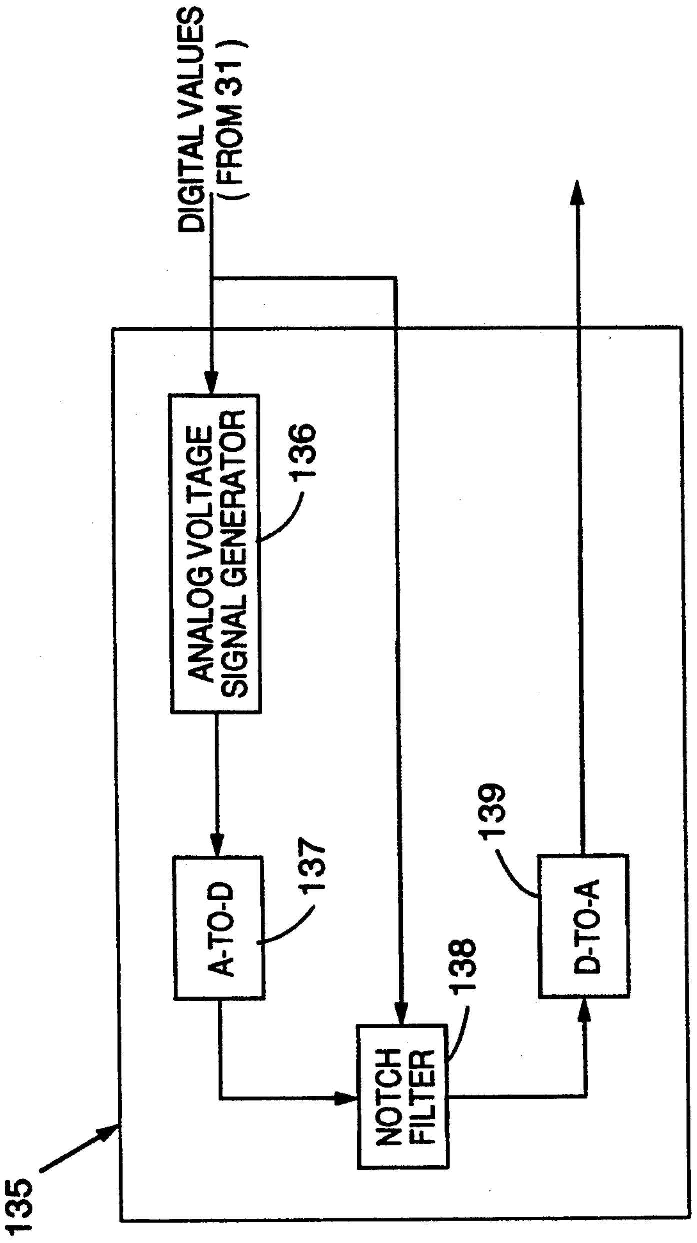
FIG. 1A is a block diagram of an alternative embodiment of the supplemental AC voltage generation circuit of FIG. 1.
Figure 1B:
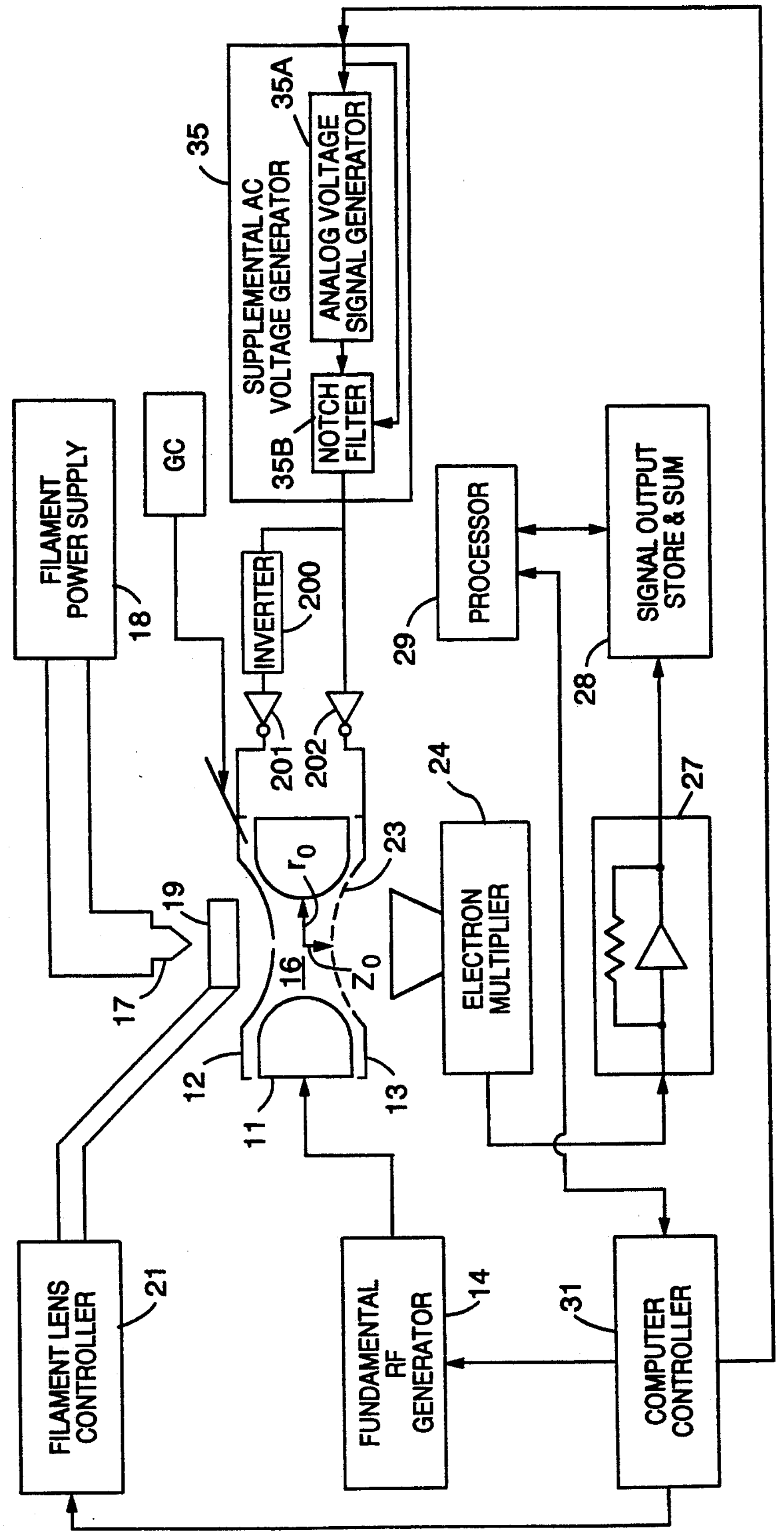
FIG. 1B is a simplified schematic diagram of a variation on the apparatus shown in FIG. 1.

In the alternative embodiment shown in FIG. 1B, transformer 32 (of FIG. 1) is replaced by inverter circuit 200 and driver circuits 201 and 202. The voltage signal asserted at the output of notch filter circuit 35B, and is applied through inverter 200 and driver 202 to electrode 12. In variations on the FIG. 1B embodiment, circuit 202 is deleted (or circuits 200 and 201 are deleted) and replaced by an open circuit, so that the inverted (or non-inverted) output of generator 35 is applied to only a single one of electrodes 12 and 13. In other variations on the FIG. 1B embodiment, the voltage asserted at the output of driver 201 (or 202) is applied to ring electrode 11 (rather than to electrode 12 or 13).

In preferred embodiments, the digital values received by analog voltage signal generation circuitry 35A include amplitude control data, and analog voltage signal circuitry 35A controls the gain it applies to the analog signal output therefrom in response to the amplitude control data.

In another class of embodiments, generator 35 is replaced by a supplemental AC voltage generator 135 of the type shown in FIG. 1A. Generator 135 includes analog voltage signal generation circuitry 136 for generating the analog optimized broadband signal of the invention (in response to digital values received from controller 31), analog-to-digital conversion circuit 137 for digitizing the output of circuitry 136, digital signal processor 138 (for implementing a notch filter having parameters determined by digital values received from controller 31), and digital-to-analog conversion circuit 139 (for converting the notch-filtered digital signal output from processor 138 into an analog filtered noise signal).

Figure 2:
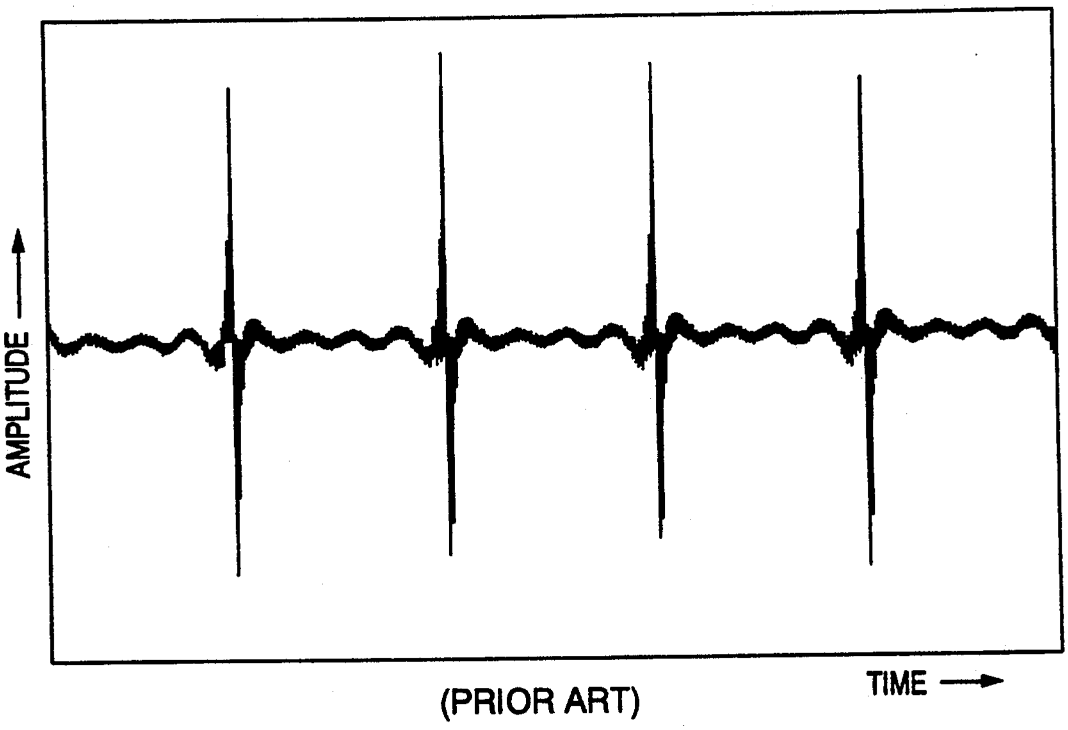
(PRIOR ART) FIG. 2
FIG. 2 is the waveform of an unoptimized broadband signal.

When a series of sinusoidal (or other periodic) waveforms (having uniform phase) are arithmetically summed, the result is a signal having large dynamic range which has a waveform of the type shown in FIG. 2. As shown in FIG. 2, such a signal has very large amplitude excursions over a small percentage of its waveform. Generation of a broadband voltage signal in this conventional manner (for example, in circuit 35A of the FIG. 1 apparatus) has several practical disadvantages. The large amplitude excursions o^f such a signal require use of a power supply having high voltage output, which in turn results in an enhanced amount of electronic noise and distortion in the broadband voltage signal. Also, because of the fixed conversion accuracy of waveform generating electronic circuitry (i.e., digital processing circuitry within controller 31 in the FIG. 1 apparatus), a larger dynamic range of the broadband signal implies that the individual sinusoidal (or other periodic) components will be modeled with proportionately lower resolution. This results in additional sources of modeling error and contributes to generation of harmonic components by each individual sinusoidal (or other periodic) component of the broadband signal.

Figure 3:
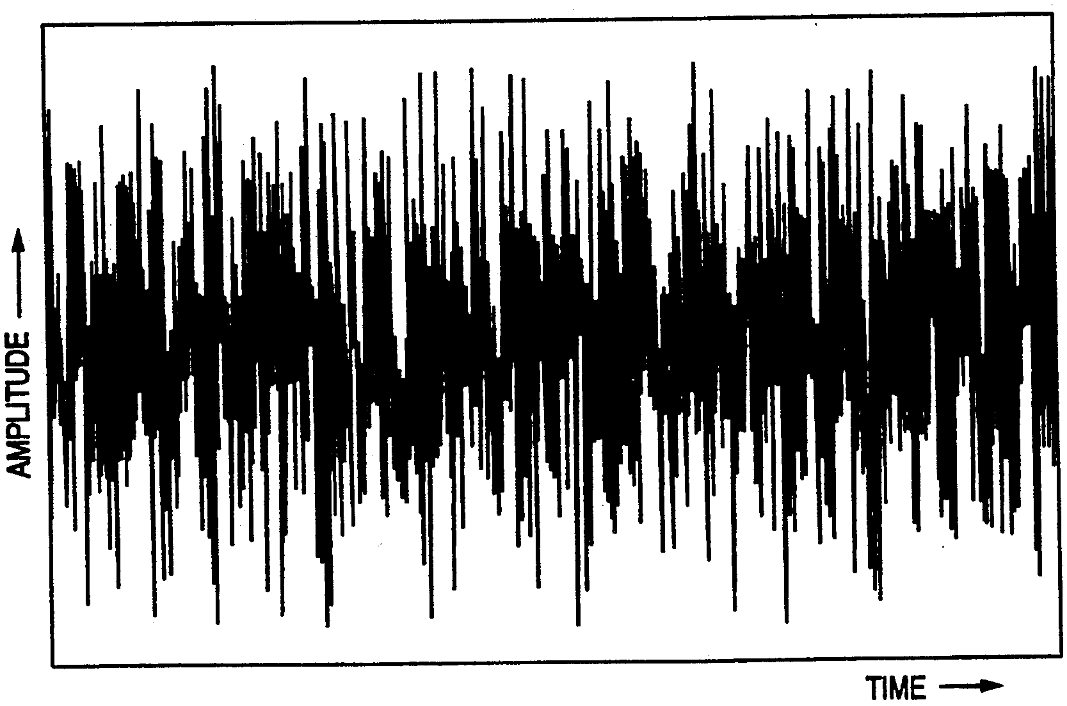
FIG. 3 is the waveform of an optimized broadband signal having the same frequency components as that of FIG. 2, but whose frequency components have had their phases determined in accordance with a preferred embodiment of the inventive method.

For these reasons, both the unfiltered broadband signal of the invention (the signal supplied to the notch filter input) and the filtered noise signal of the invention (the notch-filtered broadband signal output from the notch filter) have reduced dynamic range, such as that of the waveform shown in FIG. 3. Preferably, the dynamic range of each is minimized over its entire duration. A signal having the waveform shown in FIG. 3 will have much smaller maximum amplitude than a conventional signal having the waveform shown in FIG. 2, if the two signals have the same time-averaged power.

The expression "filtered noise signal" is used throughout the specification to denote a signal generated by the two-step process of generating an optimized broadband signal, and notch-filtering the optimized broadband signal by removing, amplifying, or attenuating one or more selected frequencies or frequency ranges thereof.

The optimized broadband signal can be composed of a discrete set, or a continuous range, of frequency components. For a discrete set of frequency components, the frequency components will typically be approximately sinusoidal components whose central frequencies are separated by sufficiently small frequency differences that the broadband signal produced by summing the components presents a continuous spectral excitation to the physical system to which it is applied. It is possible to produce such continuous excitation because the frequency-amplitude spectrum of each "approximately sinusoidal" frequency component actually employed will, in practice, have a finite bandwidth including frequencies other than a central frequency. In contrast, an ideal sinusoidal signal has a Fourier transform having zero bandwidth, which occupies a single, central frequency. The "non-central" frequency components of a discrete set of approximately sinusoidal components (which "non-central" components fill the frequency space between the discrete central frequencies) can supply sufficient energy to resonate unwanted ions out of a trap or otherwise excite ions having resonant frequencies in the non-central frequency ranges during mass spectrometry.

Typical embodiments of the invention generate an analog voltage version of the optimized broadband signal. In a preferred embodiment, such an optimized broadband signal is produced by generating (in a digital computer) a set of digital values (i.e., frequency, amplitude, and phase) which define a set of frequency components, and then generating digital signals whose voltage levels represent the digital values. An analog broadband signal is then generated from the digital signals in a digital-to-analog converter. Due to the limitations of memory storage, in order to produce a broadband signal having long time duration, it is often desirable that the broadband signal comprise repeated identical signal portions. To generate such repeated signal portions (each representing an interval U of the broadband signal's total duration T, where T=ZU, with Z being the number of identical signal portions in the broadband signal), values defining the frequency components of one signal portion are repeatedly output, from memory within the digital computer, to circuitry which processes the values to generate an analog version of the broadband signal.

The notch-filtering operation (the second step of the inventive method of filtered noise signal generation) can be performed by analog filtering (using passive or active analog electronic circuitry to process an analog version of the broadband signal produced during the first step. Alternatively, the notch-filtering operation can be performed by digital filtering (using digital signal processing circuitry implementing a digital filtering algorithm, and analog-to-digital and digital-to-analog conversion electronics such as those described above with reference to FIG. 1A), or by mathematical filtering (in which a digital computer "edits" the digital values which define a mathematical representation of the optimized broadband signal spectrum, and then outputs the edited values, which define notch-filtered components of the broadband signal spectrum, for use in generating an analog filtered noise signal).

Preferably, mathematical filtering is performed to implement the notch-filtering step of the inventive method. For example, mathematical filtering is performed by software within computer controller 31 of FIG. 1, and the resulting "mathematically notch-filtered" digital values are processed in analog voltage signal generation circuit 35A to generate the inventive analog filtered noise signal. The mathematical filtering can be accomplished by deleting from the set of digital values which define the optimized broadband signal, frequency components of the optimized broadband signal whose frequencies fall within a "notch" range (this can be done by combining the digital values which define the optimized broadband signal, and then adding to the combined values inverted versions of those of the frequency components whose frequencies fall within the "notch" range). In another example, mathematical filtering is performed by software within controller 31 which generates an optimized broadband signal in "piecewise" fashion, by generating first digital values defining a first optimized broadband signal having frequency components which span a frequency range from f1 to f2, and second digital values defining a second optimized broadband signal having frequency components which span a frequency range from f3 to f4 (where f1<f2<f3<f4). The first and second digital values together define a notched optimized broadband signal (having a notch in the range from f2 to f3), and can be supplied to analog voltage signal generation circuit 35A which will process them to generate an embodiment of the inventive analog filtered noise signal having a notch in the range from f2 to f3. In the examples discussed in this paragraph, notch filter circuit 35B of FIG. 1 is not used, and can be disabled or deleted.

The optimized broadband signal of the invention can also be generated in "piecewise" fashion, by generating first digital values defining a first optimized broadband signal having frequency components which span a frequency range from f1 to f2, and second digital values defining a second optimized broadband signal having frequency components which span a frcquency range from f3 to f4 (where f1<f2, f3<f4, and f2 is equal or substantially equal to f3). In this case, the first and second digital values together define an embodiment of the inventive optimized broadband signal, which can be notch-filtered in any desired manner to generate the inventive filtered noise signal.

Figure 4:
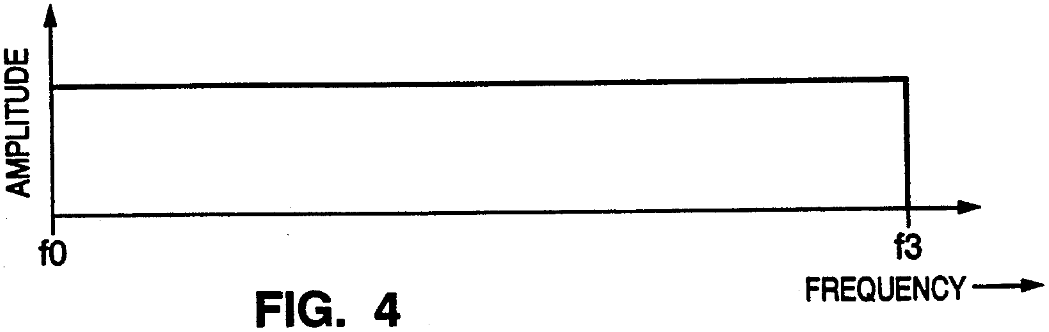
FIG. 4 is the frequency-amplitude spectrum of an optimized broadband signal generated in accordance with the invention.
Figure 5:
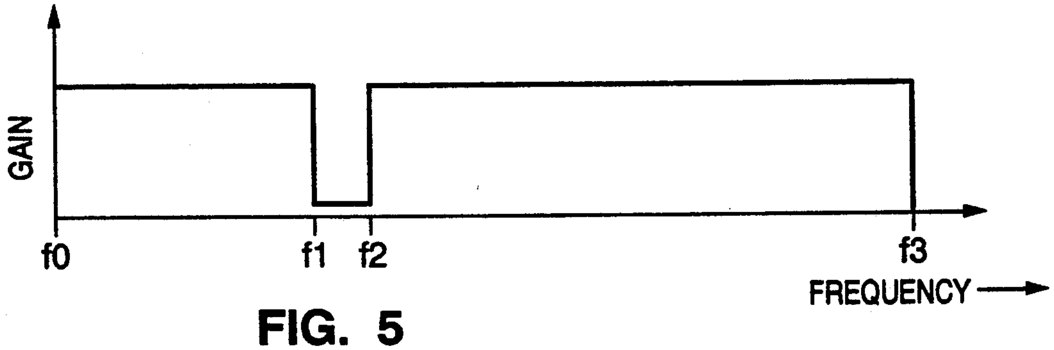
FIG. 5 is a diagram of an example of a notch filter characteristic, of a type which can be implemented by notch filter circuit 35B of FIG. 1.
Figure 6:
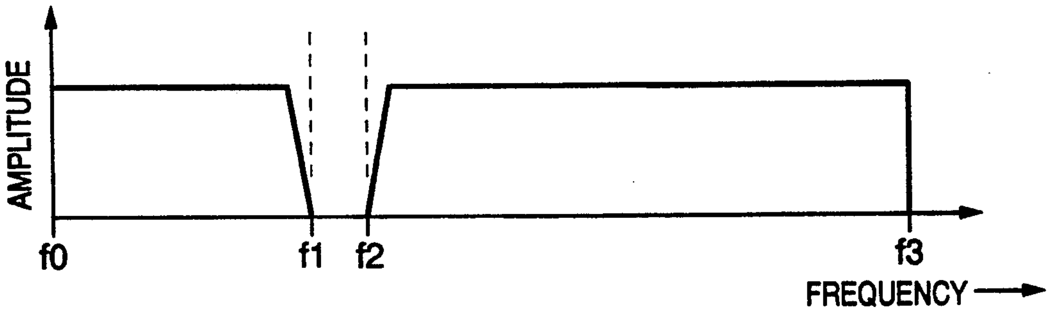
FIG. 6 is a frequency-amplitude spectrum of a filtered noise signal obtained by filtering the optimized broadband signal of FIG. 4 in the notch filter of FIG. 5.

A first class of preferred embodiments of the invention will be described with reference to FIGS. 4, 5, and 6. In these embodiments, the inventive filtered noise signal has the frequency-amplitude spectrum shown in FIG. 6. Its lowest frequency component has frequency $f_0$, its highest frequency component has frequency $f_3$, and it has no frequency components (of significant amplitude) in the notch between frequencies $f_1$ and $f_2$. The filtered noise signal of FIG. 6 is generated by producing a broadband signal having the frequency-amplitude spectrum shown in FIG. 4, and filtering this broadband signal in the notch filter having gain (as a function of frequency) as shown in FIG. 5.

To generate an optimized broadband signal in this class of embodiments, a digital computer (e.g., computer controller 31 of FIG. 1) iteratively generates values indicative of the amplitude, frequency, and phase of each frequency component of the optimized broadband signal. These values are supplied to a digital-to-analog converter (such as D-to-A converter 35A in FIG. 1) to generate an analog, optimized broadband signal.

A preferred embodiment of the iterative digital signal generation operation mentioned in the previous paragraph includes the following steps:

(a) generating a first sinusoidal (or other periodic) frequency component signal having a first frequency, a first amplitude, and a known phase angle relative to the start of the broadband waveform segment being constructed;

(b) generating a trial signal by adding the first frequency component signal to a previously determined optimal frequency component set, and generating a dynamic range signal indicative of the trial signal's dynamic range;

(c) incrementally changing the phase angle (not the frequency) of the frequency component added to the optimal frequency component set during step (b) (the "trial" frequency component) to generate a new trial frequency component;

(d) subtracting the trial frequency component from the trial signal generated in step (b), and replacing said trial frequency component by the new trial frequency component to generate a new trial signal, and generating a new dynamic range signal indicative of the new trial signal's dynamic range (in preferred embodiments of the invention, the value of the new trial signal's dynamic range is recorded);

(e) repeating steps (c) and (d) for each of M different phase angles which span a desired range, to identify one of the trial signal and the new trial signals which has minimum dynamic range as an optimal trial signal, and identifying the frequency components of the optimal trial signal as an expanded optimal frequency component set (in preferred embodiments of the invention, the frequency, amplitude, and phase of the frequency components of the optimal trial signal are recorded); and (f) repeating steps (a)-(e) for an additional sinusoidal (or other periodic) frequency component having a frequency different than that of any frequency component generated during a previous repetition of step (a).

In the preceding description, and throughout this specification (including in the claims), the operation of "subtracting" a second signal from a first signal is preferably performed by adding to the first signal an inverted version of the second signal. If the second signal is a sinusoidal signal, the inverted version of the second signal can be generated by shifting the second signal's phase by 180 degrees. It is contemplated that the first and second signals recited in this definition can be digital signals (such as those processed by a digital computer) or analog signals.

In step (b), the "previously determined optimal frequency component set" can consist of one or more frequency components each having a frequency different than that of any frequency component generated in any performance of step (a), or it can be the "expanded optimal frequency component set" generated during a previous repetition of step (e).

Step (f) can be repeated for each sinusoidal (or other periodic) frequency component to be included in the optimized broadband signal (i.e., for all frequencies necessary to excite, in desired fashion, the physical system to which the optimized broadband signal will be applied after it is notch filtered), or for only a subset of such frequency components.

Some embodiments of the invention generate a partially optimized broadband signal, having one or more frequency components on which steps (a)-(e) have been performed, as well as other frequency components on which these steps have not been performed. In one embodiment of the invention, an analog version of the partially optimized broadband signal is generated, and the time-averaged energy of the analog version is identified over intervals of its total duration, T, in order to identify one or more "flat" intervals over which the time-averaged energy is substantially constant (either throughout the interval or at least over beginning and ending portions of the interval). By storing a portion of the partially optimized signal having duration U (where $U<T$) and corresponding to at least one of the flat intervals, a better optimized broadband signal (having lower dynamic range than the above-mentioned partially optimized signal) can be generated from the stored flat interval signal by repeatedly reading the flat interval signal out from storage, or otherwise concatenating several identical copies of the flat interval signal.

During each iteration of step (c), the phase of the trial frequency component is incremented by a desired phase shift (for example, a positive amount such as +10 degrees, or a negative amount such as −10 degrees) to generate the new trial frequency component. Alternatively, each cycle through steps (a) through (e) is performed in two stages. In the first stage ("coarse optimization"), the phase of the trial frequency component is incremented by a relatively large amount (such as +10 degrees or +1 degree) during each iteration of step (c), preferably through the entire 360 degree range of possible phase shifts. A minimum dynamic range and a set of optimal frequency components are identified. Then, in the second stage ("fine optimization"), the phase of the same trial frequency component is incremented during each remaining iteration of step (c) by a relatively small phase shift (e.g., +1 degree or +0.1 degree) about the optimal phase shift value determined during coarse optimization, until a new minimum dynamic range and a set of corresponding "more optimal" frequency components are identified.

In other variations, a first loop through steps (a) through (f) is performed, with the trial frequency component's phase incremented by a first phase shift during each iteration of step (c). Then, a second loop through steps (a) through (f) is performed on each frequency component of the broadband signal generated during the first loop, with the trial frequency component's phase incremented by a second phase shift (smaller than the first phase shift) during each iteration of step (c), to generate a better optimized broadband signal (having lower dynamic range than the broadband signal generated as a result of the first loop). There is no limit to the number of such optimization loops which can be sequentially performed. Performance of such optimization loops can be repeated until an acceptable level of dynamic range has been achieved.

For example, there can be 36 iterations of step (c) for each frequency component during a first loop, if each incremental phase shift is +10 degrees, and the entire 360 degree range of possible phase shifts is covered for each frequency component. In this example, the first loop can be followed by a second loop comprising 360 iterations of step (c) for each frequency component, with each incremental phase shift equal to +1 degrees, and with the entire 360 degree range of possible phase shifts covered for each frequency component.

In a class of embodiments, the individual sinusoidal (or other periodic) components which comprise the optimized broadband signal spectrum have frequencies $f_n=f_0+n(df)$, where $f_n$ is the frequency of the "nth" sinusoidal (or other periodic) component, $f_0$ is the lowest frequency component in the spectrum, n is an integer in the range from 0 through N (where $(N+1)$ is the total number of sinusoidal (or other periodic) components present), and df is the frequency separation between adjacent frequency components.

The optimized broadband signal should contain all frequencies necessary to excite the physical system to which it will be applied (e.g., the undesired ions trapped in an ion trap). In mass spectrometry applications, at the high frequency end of the spectrum (corresponding to ions having lowest ion mass-to-charge ratio), there will typically be a frequency separation of several kilohertz between frequency components for exciting ions having consecutive mass-to-charge ratios, but at the low frequency end of the spectrum, there will typically be a much smaller frequency separation between frequency components for exciting ions having consecutive mass-to-charge ratios. The frequencies of the optimized broadband signal frequency components should be sufficiently close so as to present a substantially continuous band of frequencies to that physical system. In the embodiments of the previous paragraph, this implies that the separation df should be sufficiently small that the broadband signal presents a substantially continuous band of frequencies to the physical system.

It is desirable that the frequencies of the frequency components of the optimized broadband signal should not undergo significant or any phase shifts while the optimized broadband signal is applied to the physical system (i.e., during repetitive application of the digital values defining the broadband signal to circuitry for generating a digital voltage signal from these values). In the embodiments of the second paragraph above, this implies that it is desirable that the period of each sinusoidal (or other periodic) component should divide evenly into T, the time duration (or period) of the broadband signal waveform. In other words, $f_n$ is equal to or approximately equal to i/T, where i is any positive integer.

The difference in frequency between adjacent frequency components of the optimized broadband signal, and the amplitude of each of the frequency components, is preferably chosen so that each segment (in the time domain) of the optimized broadband signal contributes substantially the same amount of time-averaged energy to the system to which the signal is applied as does every other segment thereof. In the embodiments of the third paragraph above, this implies that $(f_n+f_m)$ is equal to or approximately equal to n/T, and $(f_n-f_m)$ is equal to or approximately equal to n/T, where $f_n$ and $f_m$ are the frequencies of any two sinusoidal (or other periodic) components in the broadband signal spectrum, n is any positive integer, and T is the duration (or period) of the broadband signal waveform. Thus, in these embodiments, satisfaction of the criteria for generation of a flat energy spectrum broadband signal waveform implies satisfaction of the criterion (discussed in the previous paragraph) for ensuring that the broadband signal does not undergo significant or any phase shifts.

Where each frequency component of the inventive optimized broadband signal has the same maximum instantaneous voltage, $E_0$, the power of the optimized broadband signal is $P_n=((E_0 \sin(2\pi f_n t))^2)/X=(E_n)^2/X$, where $E_n$ is the instantaneous voltage developed by the "nth" sinusoidal (or other periodic) frequency component, X is the electrical impedance of the system to which the broadband signal is applied, $f_n$ is the frequency of the "nth" sinusoidal (or other periodic) frequency component, and t is time.

Therefore, for a total of N sinusoidal (or other periodic) frequency components, each contributing an equal power (proportional to the square of the voltage applied), the quantity $(NP_n)^{\frac{1}{2}}$ will be proportional to $N^{\frac{1}{2}}E_n$. Thus, when building a flat energy spectrum broadband waveform, the amplitude of the waveform will increase in proportion to the square root of the number (N) of sinusoidal (or other periodic) components contained in the waveform. It follows that the amplitude of the inventive optimized broadband signal (even a version having an ideally flat energy spectrum) will be greater than or equal to the amplitude of one of its sinusoidal (or other periodic) components multiplied by the square root of the number (N) of sinusoidal (or other periodic) components thereof.

With reference to FIG. 6, the filtered noise signal of the invention will typically have a V-shaped (or U-shaped) notch after undergoing filtering in a notch filter having a sharp-edged notch as shown in FIG. 5.

With reference to FIG. 5, the optimal width of each notch of the notch filter (e.g., width $f_2-f_1$ in FIG. 5) depends on the physical system to which the inventive filtered noise signal is to be applied. For mass spectrometry applications, at the high frequency end of the notch filter's spectrum (corresponding to ions having lowest ion mass-to-charge ratio), a wide notch (e.g., having a width of one half kilohertz) will typically suffice to isolate a single ion species (having a particular mass-to-charge ratio) while exciting undesired ions having mass-to-charge ratios adjacent to that of the single ions species. However, at the low frequency end of the spectrum, a much narrower notch must typically be employed to isolate a single ion species while exciting undesired ions of adjacent mass-to-charge ratios.

Preferably, the optimized broadband signal of the invention will include frequency component signals whose frequencies span a mass range of interest in a mass spectrometry experiment.

Various modifications and variations of the described method of the invention will be apparent to those skilled in the art without departing from the scope and spirit of the invention. Although the invention has been described in connection with specific preferred embodiments, it should be understood that the invention as claimed should not be unduly limited to such specific embodiments.

What is claimed is:

1. A method for generating an optimized broadband signal for use in mass spectrometry applications, including the steps of:

(a) generating a trial sum by adding a trial frequency component signal to a previously determined optimal frequency component set, wherein the trial sum has a dynamic range and the trial frequency component signal has a phase angle, and generating a dynamic range signal indicative of said dynamic range, wherein the trial frequency component signal has a first frequency and the phase angle has a known value during a first iteration of step (a);

(b) incrementally changing the phase angle of the trial frequency component signal to generate a new trial frequency component signal;

(c) subtracting the trial frequency component signal from the trial sum generated during step (a), and replacing said trial frequency component signal by the new trial frequency component signal to generate a new trial sum having a new dynamic range, and generating a new dynamic range signal indicative of said new dynamic range;

(d) repeating steps (b) and (c) for each of M different phase angles spanning a desired phase angle range, where M is an integer, to identify one of said trial sum and each said new trial sum having a minimum dynamic range as an optimal trial signal, and identifying frequency component signals comprising said optimal trial signal as an expanded optimal frequency component set;

(e) repeating steps (a) through (d), wherein during each repetition of steps (a) through (d) the trial frequency component signal has a frequency different than the first frequency, and wherein the optimal trial signal resulting from a final repetition of steps (a) through (d) is the optimized broadband signal; and (f) employing the optimized broadband signal during performance of a mass spectrometry method.

2. The method of claim 1, wherein step (f) includes the steps of notch filtering the optimized broadband signal to generate a filtered noise signal, and applying the filtered noise signal to at least one electrode of a mass spectrometer.

3. The method of claim 1, wherein step (e) includes the steps of:

performing N repetitions of steps (a) through (d), where N is a positive integer, where the trial frequency component signal employed during each of the repetitions has a frequency different than does each trial frequency component employed during prior ones of the repetitions.

4. The method of claim 3, wherein the optimized broadband signal resulting from the final repetition of steps (a) through (d) is a partially optimized broadband signal having N+P frequency components, where P is a positive integer, and also including the steps of:

generating an analog version of the partially optimized broadband signal having a total duration T and a time-averaged energy; and determining the time-averaged energy of the analog version of the partially optimized broadband signal over intervals of the total duration, and identifying a flat interval over which said time-averaged energy is substantially constant.

5. The method of claim 4, also including the steps of:

storing a flat interval signal having duration U, where U is less than T, wherein the flat interval signal is a portion of the partially optimized broadband signal which corresponds to said flat interval; and generating a better optimized broadband signal, having lower dynamic range than the partially optimized signal, by concatenating the flat interval signal with itself.

6. The method of claim 1, wherein step (e) includes the steps of:

performing a first set of repetitions of steps (a) through (d), wherein during each repetition in the first set the trial frequency component signal has a frequency in a range from a first frequency to a second frequency greater than the first frequency, to generate a first portion of the optimized broadband signal; and performing a second set of repetitions of steps (a) through (d), wherein during each repetition in the second set the trial frequency component signal has a frequency in a frequency range from a third frequency to a fourth frequency greater than the third frequency, to generate a second portion of the optimized broadband signal.

7. The method of claim 1, where the third frequency is greater than the second frequency.

8. The method of claim 1, where the third frequency is substantially equal to the second frequency.

9. The method of claim 1, also including the step of generating an analog version of the optimized broadband signal.

10. The method of claim 1, wherein the optimized broadband signal includes frequency component signals whose frequencies span a mass range of interest in a mass spectrometry experiment.

11. The method of claim 1, wherein subtraction of the trial frequency component signal from the trial sum during step (c) includes the step of:

generating an inverted version of the trial frequency component signal and adding said inverted version to the trial sum.

12. The method of claim 1, also including the step of:

notch-filtering the optimized broadband signal to generate a filtered noise signal.

13. The method of claim I, wherein step (d) includes the following steps:

a coarse optimization operation comprising M–A repetitions of steps (b) and (c), where A is an integer, wherein during each repetition of step (b), the phase angle of the trial frequency component signal is incrementally changed by a first increment; and a fine optimization operation comprising A repetitions of steps (b) and (c), wherein during each repetition of step (b), the phase angle of the trial frequency component signal is incrementally changed by a second increment smaller than the first increment.

14. The method of claim 1, wherein each repetition of steps (a) through (d) includes the following steps:

a first iteration of steps (a) through (d), in which during each repetition of step (b), the phase angle of the trial frequency component signal is incrementally changed by a first increment; and a second iteration of steps (a) through (d), in which during each repetition of step (b), the phase angle of the trial frequency component signal is incrementally changed by a second increment smaller than the first increment.

15. The method of claim 1, wherein a first segment of the optimized broadband signal has a first time-averaged energy, and each other segment of the optimized broadband signal has a time-averaged energy substantially equal to the first time-averaged energy, where each of the first segment and said each other segment has a duration longer than the period of the highest frequency component of the optimized broadband signal.

16. A signal generation method, including the steps of:

(a) iteratively varying phases of trial frequency components of a broadband signal to identify a set of optimal frequency components which, when summed together, determine a broadband signal having an optimized dynamic range;

(b) generating said broadband signal having said optimized dynamic range from the optimal frequency components;

(c) generating the filtered noise signal by notch-filtering the broadband signal; and (d) employing the filtered noise signal during performance of a mass spectrometry method.

17. The method of claim 16, wherein the filtered noise signal is an analog voltage signal, wherein step (d) includes the step of:

applying the filtered noise signal to an ion trap.

18. The method of claim 16, wherein the broadband signal having the optimized dynamic range is an analog signal, and wherein step (c) includes the step of:

analog filtering the broadband signal having said optimized dynamic range in an analog notch filter means.

19. The method of claim 16, wherein the filtered noise signal is an analog voltage signal, the broadband signal having the optimized dynamic range is an analog signal, and step (c) includes the steps converting the broadband signal having said optimized dynamic range to a digital signal in an analog-to-digital conversion means;

digitally notch-filtering the digital signal to generate a notch-filtered digital signal; and converting the notch-filtered digital signal into the filtered noise signal in a digital-to-analog conversion means.

20. The method of claim 16, wherein step (a) includes the steps of:

(e) generating a trial sum by adding a trial frequency component signal to a previously determined optimal frequency component set, wherein the trial sum has a dynamic range and the trial frequency component signal has a phase angle, and generating a dynamic range signal indicative of said dynamic range, wherein the trial frequency component signal has a first frequency and the phase angle has a known value during a first iteration of step (e);

(f) incrementally changing the phase angle of the trial frequency component signal to generate a new trial frequency component signal;

(g) subtracting the trial frequency component signal from the trial sum generated during step (e), and replacing said trial frequency component signal by the new trial frequency component signal to generate a new trial sum having a new dynamic range, and generating a new dynamic range signal indicative of said new dynamic range;

(h) repeating steps (f) and (g) for each of M different phase angles spanning a desired phase angle range, where M is an integer, to identify one of said trial sum and each said new trial sum having a minimum dynamic range as an optimal trial signal, and identifying frequency component signals comprising said optimal trial signal as an expanded optimal frequency component set; and (i) repeating steps (e) through (h), wherein during each repetition of steps (e) through (h) the trial frequency component signal has a frequency different than the first frequency.

21. The method of claim 20, wherein step (i) includes the steps of:

performing N repetitions of steps (e) through (h), where N is a positive integer, where the trial frequency component signal employed during each of the repetitions has a frequency different than does each trial frequency component employed during prior ones of the repetitions.

22. The method of claim 21, wherein the set of optimal frequency components resulting from the final repetition of steps (e) through (h) determine a partially optimized broadband signal having N+P frequency components, where P is a positive integer, and also including the steps of:

generating an analog version of the partially optimized broadband signal having a total duration T and a time-averaged energy; and determining the time-averaged energy of the analog version of the partially optimized broadband signal over intervals of the total duration, and identifying a flat interval over which said time-averaged energy is substantially constant.

23. The method of claim 22, also including the steps of:

storing a flat interval signal having duration U, where U is less than T, wherein the flat interval signal is a portion of the partially optimized broadband signal which corresponds to said flat interval; and generating said broadband signal having said optimized dynamic range by concatenating the flat interval signal with itself.

24. The method of claim 16, wherein the broadband signal having said optimized dynamic range includes frequency component signals whose frequencies span a mass range of interest in a mass spectrometry experiment.

25. A signal generation method, including the steps of:

(a) iteratively varying phases of trial frequency components of a broadband signal to identify a set of optimal frequency components which, when summed together, determine a broadband signal having an optimized dynamic range; and (b) after step (a), digitally notch-filtering the optimal frequency components to generate a set of edited frequency components which determine a filtered noise signal for use during performance of a mass spectrometry method.

26. The method of claim 25, also including the step of:

(c) generating the filtered noise signal from the edited frequency components and employing the filtered noise signal during performance of the mass spectrometry method.

27. The method of claim 26, wherein the filtered noise signal is an analog voltage signal, and wherein step (c) includes the step of:

applying the filtered noise signal to an ion trap during performance of said mass spectrometry method.

28. The method of claim 25, wherein step (a) includes the steps of:

(e) generating a trial sum by adding a trial frequency component signal to a previously determined optimal frequency component set, wherein the trial sum has a dynamic range and the trial frequency component signal has a phase angle, and generating a dynamic range signal indicative of said dynamic range, wherein the trial frequency component signal has a first frequency and the phase angle has a known value during a first iteration of step (e);

(f) incrementally changing the phase angle of the trial frequency component signal to generate a new trial frequency component signal;

(g) subtracting the trial frequency component signal from the trial sum generated during step (e), and replacing said trial frequency component signal by the new trial frequency component signal to generate a new trial sum having a new dynamic range, and generating a new dynamic range signal indicative of said new dynamic range;

(h) repeating steps (f) and (g) for each of M different phase angles spanning a desired phase angle range, where M is an integer, to identify one of said trial sum and each said new trial sum having a minimum dynamic range as an optimal trial signal, and identifying frequency component signals comprising said optimal trial signal as an expanded optimal frequency component set; and (i) repeating steps (e) through (h), wherein during each repetition of steps (e) through (h) the trial frequency component signal has a frequency different than the first frequency.

* * * * *